US010543592B2

(12) United States Patent
Esposito et al.

(10) Patent No.: US 10,543,592 B2
(45) Date of Patent: Jan. 28, 2020

(54) TOOL STAND

(71) Applicants: Adam Esposito, Glen Ellyn, IL (US); Kenneth Basa, Westmont, IL (US)

(72) Inventors: Adam Esposito, Glen Ellyn, IL (US); Kenneth Basa, Westmont, IL (US)

( * ) Notice: Subject to any disclaimer, the term of this patent is extended or adjusted under 35 U.S.C. 154(b) by 57 days.

(21) Appl. No.: 15/643,243

(22) Filed: Jul. 6, 2017

(65) Prior Publication Data

US 2018/0117757 A1 May 3, 2018

Related U.S. Application Data

(60) Provisional application No. 62/359,017, filed on Jul. 6, 2016.

(51) Int. Cl.
| | | |
|---|---|---|
| *B25H 3/06* | (2006.01) | |
| *A47B 43/00* | (2006.01) | |
| *B25H 3/04* | (2006.01) | |
| *F16B 1/00* | (2006.01) | |
| *A47B 31/00* | (2006.01) | |
| *A47B 57/10* | (2006.01) | |
| *A47B 57/20* | (2006.01) | |
| *F16B 7/10* | (2006.01) | |
| *A47B 31/04* | (2006.01) | |
| *A47B 51/00* | (2006.01) | |

(52) U.S. Cl.
CPC .............. *B25H 3/06* (2013.01); *A47B 31/00* (2013.01); *A47B 43/00* (2013.01); *A47B 57/10* (2013.01); *A47B 57/20* (2013.01); *B25H 3/04* (2013.01); *F16B 1/00* (2013.01); *A47B 31/04* (2013.01); *A47B 51/00* (2013.01); *F16B 7/105* (2013.01); *F16B 2001/0035* (2013.01)

(58) Field of Classification Search
CPC .. B25H 3/06; B25H 3/04; A47B 43/00; A47B 31/00; A47B 57/10; A47B 57/20; A47B 31/04; A47B 51/00; F16B 2001/0035; F16B 7/105
USPC ..... 211/195, 201, 206, 189, 70.6, 85.3, 207; 248/235, 241, 243, 244, 245, 124.1, 248/125.1; 108/106, 107, 147.11–147.15; 362/33, 89, 127, 132, 133, 253, 234
See application file for complete search history.

(56) References Cited

U.S. PATENT DOCUMENTS

| 217,471 | A | * | 7/1879 | Massey | .................. | A47B 57/20 |
| | | | | | | 108/147.16 |
| 281,494 | A | | 7/1883 | Groebl | | |
| 681,098 | A | | 8/1901 | Brown | | |
| 727,407 | A | * | 5/1903 | Murphy | .................... | E04G 1/20 |
| | | | | | | 182/145 |
| 1,008,477 | A | * | 11/1911 | Kohn | ........................ | A47F 7/24 |
| | | | | | | 211/204 |

(Continued)

*Primary Examiner* — Jonathan Liu
*Assistant Examiner* — Devin K Barnett
(74) *Attorney, Agent, or Firm* — Erickson Law Group, PC

(57) ABSTRACT

A tool stand provides a tool tray supported on a frame and the tool tray can be lowered on the frame for compact storage and transportation of the tool stand and tools carried by the tray. The tool stand can provide two legs or columns that support the tray and also can be folded at the top to form a bar handle. The tray can be selectable positioned in elevation on the columns. The tool stand can provide magnetic accessories such as a media viewer mount that can be advantageously positioned on the tool tray to assist the user.

17 Claims, 14 Drawing Sheets

(56) References Cited

U.S. PATENT DOCUMENTS

| | | | | |
|---|---|---|---|---|
| 1,128,324 A * | 2/1915 | Jones | F21V 21/08 | 248/214 |
| 1,476,607 A | 12/1923 | Hanson | | |
| 1,830,282 A * | 11/1931 | Lorch | A47B 61/003 | 211/204 |
| 1,883,974 A * | 10/1932 | Kusterle | A47B 23/04 | 108/10 |
| 2,005,566 A * | 6/1935 | Schwabe | A47B 31/04 | 108/177 |
| 2,116,386 A | 5/1938 | Copeland | | |
| 2,120,511 A * | 6/1938 | Risdon | A47F 7/24 | 211/85.3 |
| 2,177,678 A * | 10/1939 | Uhri, Jr. | A47B 57/00 | 108/106 |
| 2,260,294 A * | 10/1941 | Brown | A47F 7/175 | 211/44 |
| 2,486,077 A * | 10/1949 | Taylor | A63B 25/00 | 482/76 |
| 2,675,981 A | 4/1954 | Ferris | | |
| 2,748,955 A * | 6/1956 | Anselmo | A47B 43/00 | 211/204 |
| 2,793,764 A * | 5/1957 | Stork | A47F 7/24 | 211/204 |
| 2,805,905 A | 9/1957 | Levitan et al. | | |
| 2,819,938 A * | 1/1958 | Zerver | A47B 31/00 | 312/201 |
| 2,830,825 A * | 4/1958 | Webber | A47B 31/00 | 280/79.3 |
| 2,849,745 A * | 9/1958 | Madsen | A47L 4/04 | 15/268 |
| 2,872,252 A * | 2/1959 | Konkle | B25H 5/00 | 182/131 |
| 2,885,090 A * | 5/1959 | Forman | A47B 45/00 | 211/175 |
| 2,892,547 A * | 6/1959 | Whitaker | A47B 57/20 | 108/106 |
| 2,894,642 A * | 7/1959 | Clevett, Jr. | A47B 57/26 | 108/106 |
| 2,914,283 A | 11/1959 | Jorgensen | | |
| 2,956,763 A * | 10/1960 | D Arca | B65D 19/12 | 108/53.1 |
| 2,966,992 A * | 1/1961 | Dunkelberger | B25H 3/04 | 211/70.7 |
| 3,000,683 A * | 9/1961 | Macneary | A47B 21/02 | 312/235.3 |
| 3,104,626 A * | 9/1963 | Brunette | A47B 57/06 | 108/106 |
| 3,221,678 A * | 12/1965 | Doherty | A47B 57/26 | 248/230.1 |
| 3,245,365 A * | 4/1966 | Doherty | A47B 57/26 | 108/147.13 |
| 3,339,938 A * | 9/1967 | Edmisson | B25H 3/06 | 280/79.3 |
| 3,472,392 A * | 10/1969 | Hahn | A47B 31/00 | 211/126.14 |
| 3,499,541 A * | 3/1970 | Mackie | A47B 45/00 | 211/134 |
| 3,603,542 A | 9/1971 | Grille | | |
| 3,669,392 A * | 6/1972 | Saunders | A47G 29/00 | 248/121 |
| 3,715,148 A * | 2/1973 | Beals | A47B 31/00 | 312/209 |
| 3,983,821 A | 10/1976 | Keams | | |
| 4,119,044 A * | 10/1978 | Hines | B25H 1/16 | 108/146 |
| 4,122,956 A * | 10/1978 | Hargrove | B25H 1/0007 | 108/28 |
| 4,446,796 A * | 5/1984 | Wilson | A47B 31/04 | 108/69 |
| 4,715,573 A | 12/1987 | Liegel | | |
| 4,819,900 A * | 4/1989 | Funk | A47B 57/44 | 108/108 |
| 4,881,708 A * | 11/1989 | Walter | A47B 96/02 | 248/243 |
| 4,934,015 A * | 6/1990 | Mink | A47L 4/04 | 15/268 |
| RE33,645 E * | 7/1991 | Coote | A47B 23/046 | 211/70.6 |
| 5,080,381 A * | 1/1992 | Perez | B25H 5/00 | 108/116 |
| 5,088,420 A * | 2/1992 | Russell | A47B 21/00 | 108/106 |
| 5,114,016 A * | 5/1992 | Todd | A47F 5/108 | 211/206 |
| 5,141,211 A * | 8/1992 | Adams, Jr. | B25H 3/06 | 269/16 |
| 5,181,681 A * | 1/1993 | Edwards | A47B 23/046 | 108/106 |
| 5,302,014 A * | 4/1994 | Hobson | A47B 31/00 | 211/70.6 |
| 5,374,019 A * | 12/1994 | Fischer | A47B 23/046 | 248/124.1 |
| 5,460,392 A * | 10/1995 | Hansen | B25H 5/00 | 280/32.5 |
| 5,511,674 A * | 4/1996 | Boyd | A47B 23/04 | 206/363 |
| D376,161 S * | 12/1996 | Bergersen | D15/141 | |
| 5,617,962 A * | 4/1997 | Chen | A47G 25/0664 | 211/204 |
| 5,660,276 A | 8/1997 | Winnard | | |
| 5,687,654 A * | 11/1997 | Huggins | A47B 5/00 | 108/147 |
| 5,803,422 A * | 9/1998 | Buehler | B25H 3/06 | 206/375 |
| 5,894,945 A * | 4/1999 | Curran | B25B 11/00 | 211/162 |
| 6,010,187 A * | 1/2000 | Dallas | A47C 7/62 | 108/94 |
| 6,116,163 A * | 9/2000 | Mitchell | E04G 5/00 | 108/152 |
| 6,158,357 A * | 12/2000 | Shih | A47B 21/00 | 108/150 |
| 6,240,856 B1 * | 6/2001 | Paskey | B25H 1/12 | 108/146 |
| 6,279,763 B1 * | 8/2001 | Bush | A47B 43/00 | 108/55.1 |
| 6,305,764 B1 * | 10/2001 | Kortman | A47B 43/00 | 108/162 |
| 6,443,319 B1 * | 9/2002 | Sander | A47B 57/26 | 108/106 |
| 6,688,634 B2 * | 2/2004 | Noffsinger | B25H 3/06 | 280/47.19 |
| 6,758,448 B1 * | 7/2004 | Williams | A47B 96/02 | 248/125.1 |
| 6,910,429 B1 * | 6/2005 | Matay | B25H 3/06 | 108/152 |
| 6,945,395 B2 * | 9/2005 | Hsu | G11B 33/0455 | 206/308.1 |
| 7,080,640 B2 * | 7/2006 | Sanders | A47J 33/00 | 126/30 |
| 7,287,872 B2 * | 10/2007 | Kubota | A47B 43/006 | 362/127 |
| 7,341,006 B2 * | 3/2008 | Hernandez | A47B 3/0815 | 108/115 |
| 7,344,112 B2 * | 3/2008 | Nice | B67D 7/845 | 248/125.1 |
| 7,661,685 B2 | 2/2010 | Thibault | | |
| 8,342,544 B1 * | 1/2013 | Blewett | B62B 3/022 | 211/189 |
| 8,448,907 B2 | 5/2013 | Witschen | | |
| 8,464,994 B2 | 6/2013 | Chiu | | |
| 8,517,413 B2 | 8/2013 | Chen | | |
| 8,613,454 B2 * | 12/2013 | Foley | B25H 1/0007 | 108/147 |
| 8,696,177 B1 * | 4/2014 | Frost | F21L 14/04 | 362/287 |
| 8,757,721 B2 * | 6/2014 | Greenwood | B60N 2/163 | 297/311 |

(56) References Cited

U.S. PATENT DOCUMENTS

| | | | | |
|---|---|---|---|---|
| 8,936,166 B2 * | 1/2015 | Hornsby | A47G 25/0685 | 211/182 |
| 8,967,402 B2 * | 3/2015 | Pintur | A47F 5/0018 | 211/103 |
| 8,998,011 B2 * | 4/2015 | Zhu | A47B 43/04 | 211/201 |
| 9,022,237 B2 * | 5/2015 | Hall | A47J 47/16 | 211/162 |
| 9,038,980 B2 * | 5/2015 | Greenwood | F16M 11/28 | 248/354.7 |
| 9,073,201 B1 * | 7/2015 | Foley | B25H 5/00 | |
| 9,370,277 B2 * | 6/2016 | Weaver | A47J 37/0786 | |
| 9,635,845 B1 * | 5/2017 | Swisher | A01K 97/01 | |
| D799,850 S * | 10/2017 | Heidelberger | D6/406.2 | |
| 9,833,892 B1 * | 12/2017 | Gomez | B25H 1/12 | |
| 9,872,573 B1 * | 1/2018 | Yates | A47B 1/04 | |
| 2002/0121493 A1 * | 9/2002 | Wang | A47F 7/19 | 211/195 |
| 2003/0009874 A1 * | 1/2003 | Lyne, Jr. | B25B 27/22 | 29/700 |
| 2005/0012287 A1 * | 1/2005 | Goldenberg | B62B 5/0438 | 280/47.38 |
| 2005/0204967 A1 * | 9/2005 | Wrinkle | B25H 5/00 | 108/146 |
| 2006/0091096 A1 * | 5/2006 | Velez | B62B 3/002 | 211/194 |
| 2006/0118503 A1 * | 6/2006 | Patton | A47B 95/00 | 211/187 |
| 2006/0138067 A1 * | 6/2006 | Tourlamain | B65D 19/12 | 211/195 |
| 2007/0164579 A1 * | 7/2007 | Pike | A47B 31/04 | 294/144 |
| 2007/0272642 A1 * | 11/2007 | Baptiste | A47B 43/00 | 211/201 |
| 2008/0029473 A1 * | 2/2008 | Hu | A47G 25/0664 | 211/206 |
| 2008/0116346 A1 * | 5/2008 | McCarthy | B25H 3/06 | 248/424 |
| 2008/0217276 A1 * | 9/2008 | Brady | B65D 19/12 | 211/195 |
| 2008/0237168 A1 * | 10/2008 | Harpole | B65D 19/12 | 211/195 |
| 2009/0218463 A1 * | 9/2009 | Winnard | B25H 3/04 | 248/309.4 |
| 2009/0218741 A1 * | 9/2009 | Winnard | B25H 3/06 | 269/8 |
| 2010/0000449 A1 * | 1/2010 | Botkin | A47B 57/545 | 108/152 |
| 2010/0295430 A1 * | 11/2010 | Cheng | B25H 3/028 | 312/249.11 |
| 2011/0114581 A1 * | 5/2011 | Greenspon | A47F 7/24 | 211/85.3 |
| 2013/0019547 A1 * | 1/2013 | Kim | A47B 41/02 | 52/173.1 |
| 2013/0063012 A1 * | 3/2013 | Lu | B62B 3/005 | 312/334.7 |
| 2013/0106270 A1 * | 5/2013 | Lin | B25H 1/0042 | 312/327 |
| 2014/0084558 A1 * | 3/2014 | Ergun | B62B 3/005 | 280/47.35 |
| 2014/0104806 A1 * | 4/2014 | Segar | F16M 11/08 | 361/809 |
| 2014/0139082 A1 * | 5/2014 | Green | A47B 23/042 | 312/237 |
| 2016/0037913 A1 * | 2/2016 | Franck | A47B 57/20 | 211/208 |
| 2016/0058211 A1 * | 3/2016 | Weinstein | A47F 5/135 | 211/190 |
| 2016/0220019 A1 * | 8/2016 | Cooper | A47B 57/34 | |
| 2016/0347340 A1 * | 12/2016 | Kahler | B62B 3/02 | |
| 2017/0027314 A1 * | 2/2017 | Guzman | A47B 13/08 | |

* cited by examiner

TOOL STAND

This application claims the benefit of U.S. Provisional Application 62/359,017, filed Jul. 6, 2016.

BACKGROUND

Tool stands or caddies for mechanics having elevated tool trays are known. Variations of tool stands or caddies are disclosed in U.S. Pat. Re 33,645; U.S. Pat. Nos. 8,696,177; 8,517,413; 8,464,994; 6,688,634; 4,715,573; and 4,119,044.

U.S. Pat. No. 4,119,044 describes a tool caddy having a tool tray adjustably supported on a post and having a handle for lifting the tool tray off the post.

The present inventors have recognized the drawbacks of prior tool stands of these disclosures. The present inventors have recognized that it would be desirable to have a tool stand having a tray which easily deploys from a lowered position to an elevated position that is more practical for use by an auto mechanic which raises the tool tray to a height substantially equal to an automobile hood for work inside an engine compartment of the vehicle. The present inventors have recognized that it would be desirable to provide a tool stand which is practical to use, transport and store. The present inventors have recognized that it would be desirable to provide a tool stand which allows a mechanic to easily view a media display device such as a smart phone, tablet computer, etc. while undertaking work on a vehicle or other project wherein the media display device could be conveniently carried on the tool stand for easy viewing. The present inventors have recognized the desirability of providing a tool stand which easily holds tools and parts using magnetic features either applied to the tool stand or applied to the tools such that tools could be organized easily for use by the mechanic or other user.

SUMMARY

An exemplary embodiment of the invention comprises a tool stand that provides a tool tray that is supported on a frame wherein the tool tray can be lowered on the frame for compact storage and transportation of the tool stand and tools carried thereby. The tool stand can provide two legs or columns that support the tray and also can be folded at the top to form a bar handle. The tool stand can provide magnetic accessories that can be advantageously positioned on the tool tray to assist the user. For example, an accessory can be a media viewer mount that positions a media viewer, such as a smart phone, close to the user to allow the user to refer to repair instructions provided on the viewer, the mount being positionable on the tool tray by a magnetic base. Another accessory can be a light that can assist the user in illuminating the work area, the light being positionable on the tool tray by a magnetic base.

More particularly, an exemplary embodiment of the invention comprises a mechanic's tool stand that has a rectangular frame base and two columns extending upward from the base. An upper tray is height adjustable on the columns and can be lowered for storage or transportation of the stand. A lower tray can be carried on the base and is advantageous for holding heavier tools such as hand power tools. The upper tray can include magnetic strips on sides thereof for holding tools, fasteners or parts. Upper handle portions of the columns are configured to be repositioned to meet together to form a bar style handle over the upper tray of the tool stand.

Numerous other advantages and features of the present invention will become readily apparent from the following detailed description of the invention and the embodiments thereof, from the claims and from the accompanying drawings.

DETAILED DESCRIPTION

Figure 1:
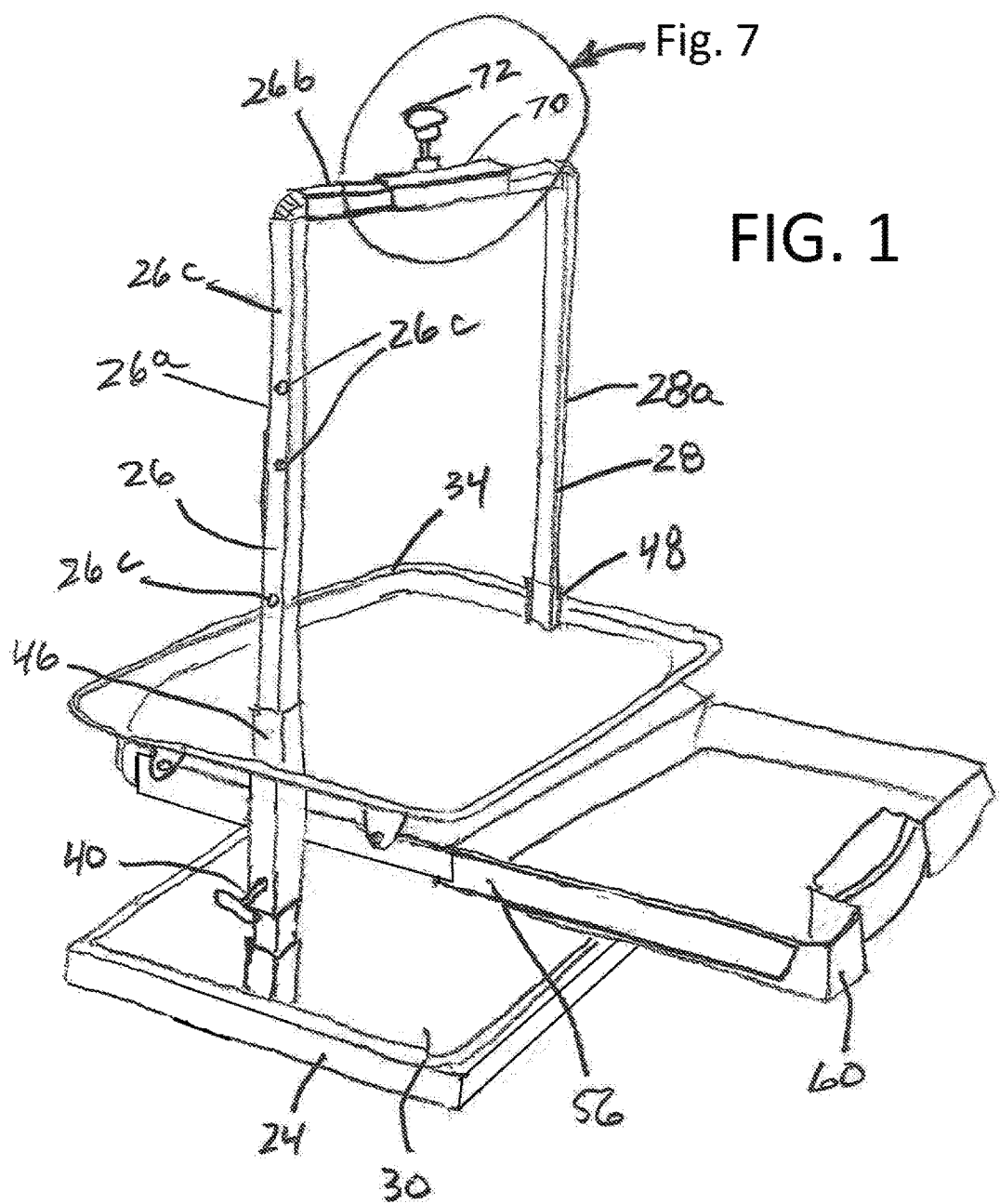
FIG. 1 is a perspective view of a tool stand according to the invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provisional Application 62/359,017, filed Jul. 6, 2016.

FIGS. 1 through 10 illustrate a tool stand 20 having a base 24, a first leg 26 and a second leg 28 connected at base ends to the base 24. A lower tray 30 is supported on the base 24. An upper tray 34 is supported on the first and second legs 26, 28 and is selectively fixed in vertical position on the legs 26, 28 by spring-loaded locking pin mechanisms 40, 42 (see FIG. 4). The upper tray 34 is fixed to a first slider 46 that slides on the first leg 26, and a second slider 48 that slides on the second leg 28.

The spring-loaded locking pin mechanisms 40, 42 are respectively mounted on the sliders 46, 48. A first drawer slide 56 is fixed to a bottom of the upper tray 34 and a second drawer slide 58 is fixed to a bottom of the upper tray 34. A tool drawer 60 is slightly carried on the two drawer slides 56, 58. In FIG. 1 the drawer 60 is shown in a fully open position. It is understood that the drawer 60 shown in FIG. 1 can be easily slid on the drawer slides 56, 58 to be located directly beneath the upper tray 34.

The first leg 26 includes a vertical column portion 26a and a handle portion 26b. The second leg 28 includes a vertical column portion 28a and a handle portion 28b. The respective handle portions 26b, 28b, are connected by hinges 27, 29 to the respective column portions 26a, 28a such that the handle portions 26b, 28b can be pivoted toward each other from a vertical orientation to a horizontal orientation. Free ends of the handle portions 26b, 28b interlock and when folded over 90 degrees and a handle slider 70 can be slid from a retracted position to a position which over lies and reinforces the connection between the handle portions 26b, 28b. A spring-loaded locking pin mechanism 72 is carried on the handle slider 70. When the slider 70 is slid into an engage position it can be locked to the handle portion 26b to fix the two handle portions 26b, 28b engaged to each other in the horizontal orientation to act as a handle.

A coil spring 66 extends internally of the column portion 26a through the handle portion 28a. The spring is fixed at its ends 66a, 66b to an inside of the respective column portion 26a and handle portion 26b. The spring 66 act to urge the handle portion 26b to a vertical orientation. A spring 68 is connected between the column portion 28a and handle portion 28b in the same way to urge the handle portion 28b to a vertical orientation.

The column portions 26a, 28a and the handle portions 26b, 28b can be composed of extruded aluminum square tubes. The sliders 46, 48 and 70 can also be composed of extruded aluminum square tubes having a slightly greater inside perimeter such as to fit closely around the outside of extruded aluminum square tubes of the respective column portions 26a, 28a and the handle portions 26b, 28b, to be slidable thereon. The base 24 can comprise a rectangular frame composed of four extruded square aluminum tubes welded together to form a rectangular shape.

The trays 30, 34 are advantageously composed of steel so as to provide a surface for magnetic attachment of tools and parts. The trays 30, 34 can be covered on top surfaces with a rubber or elastomer mesh which provides for a quieter use of the stand given collisions between the trays and tools dropped onto the trays.

Figure 2:
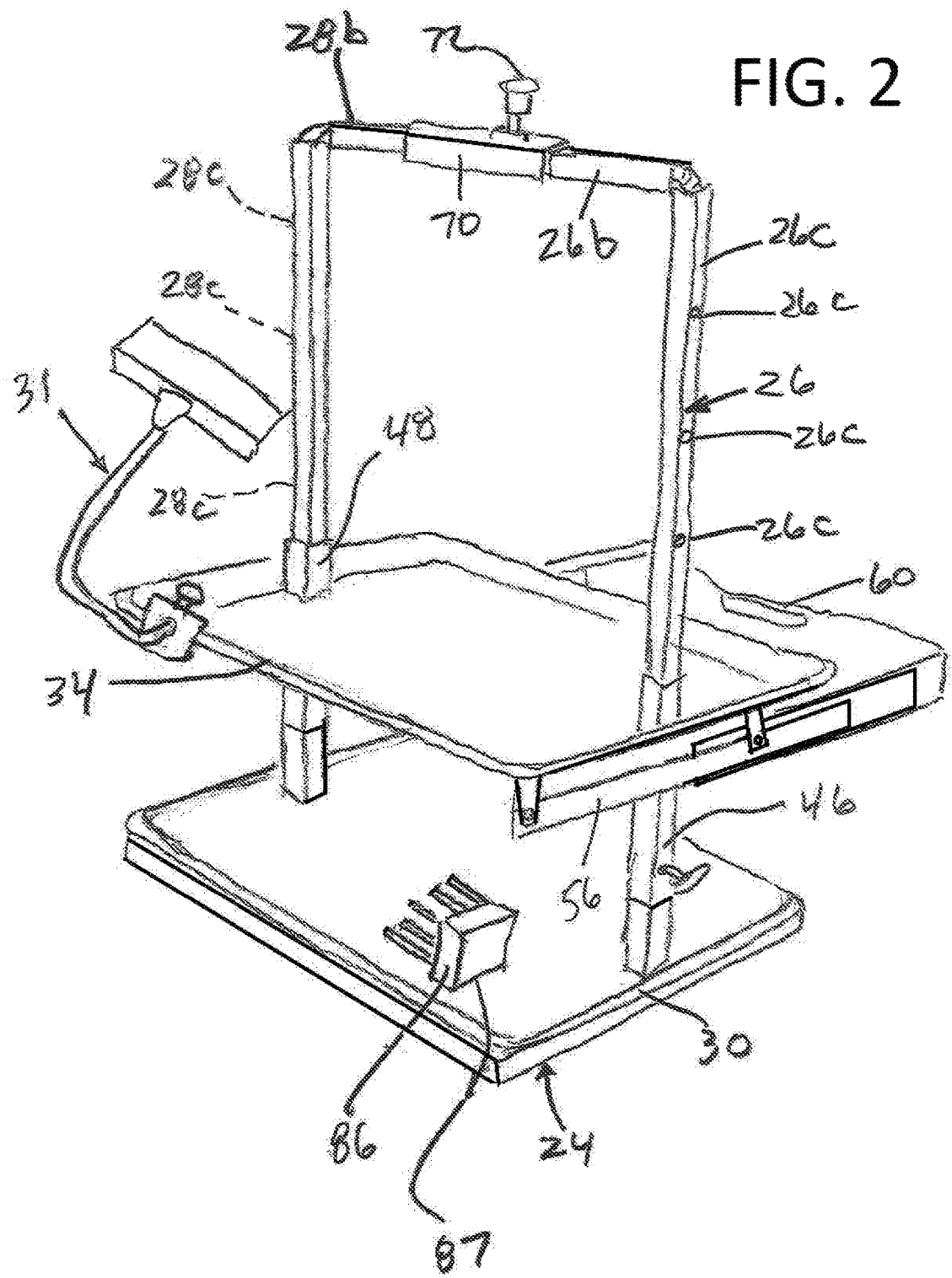
FIG. 2 is a rear perspective view of the tool stand according to FIG. 1.
Figure 3:
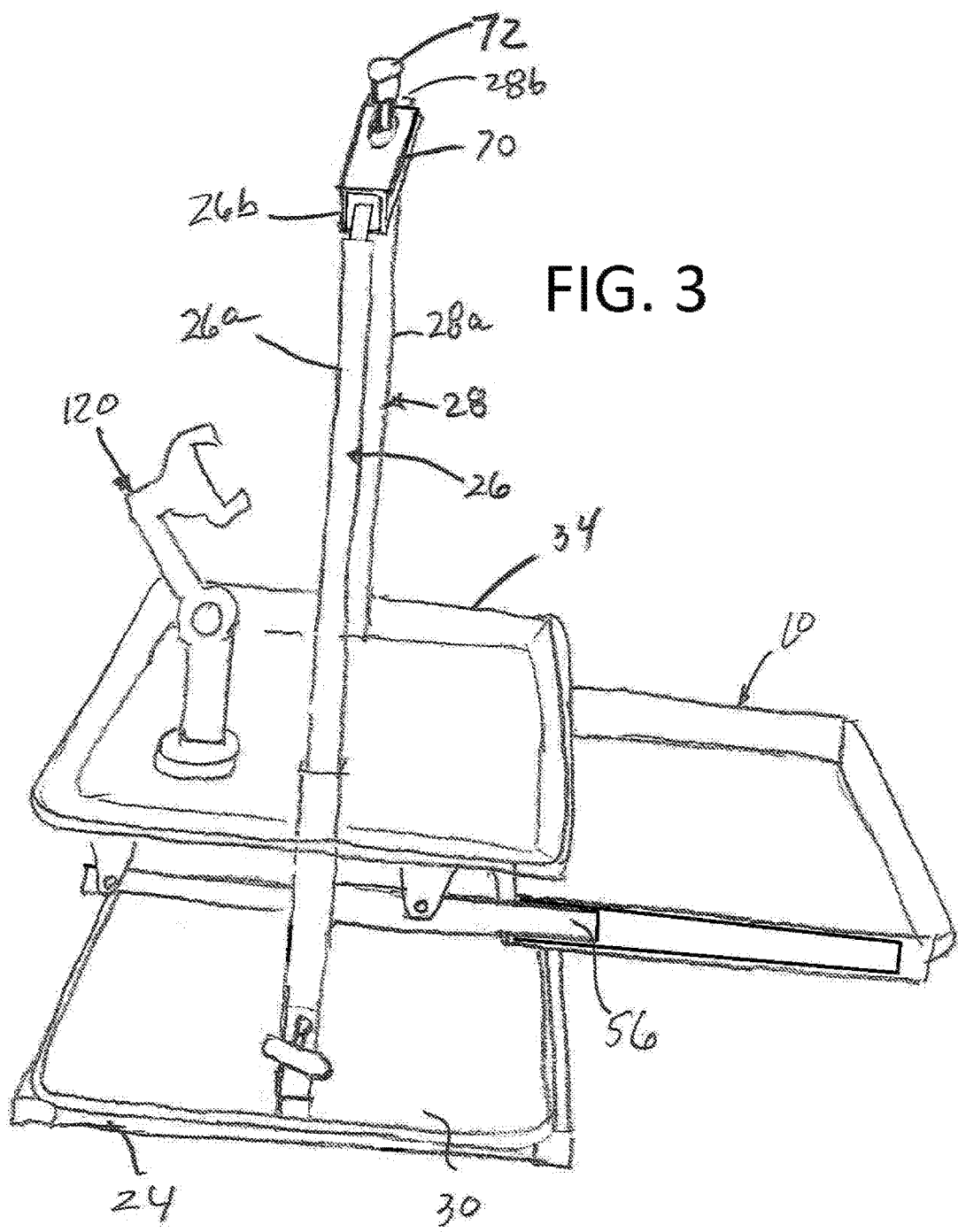
FIG. 3 is a side perspective view of the tool stand according to FIG. 1.
Figure 4:
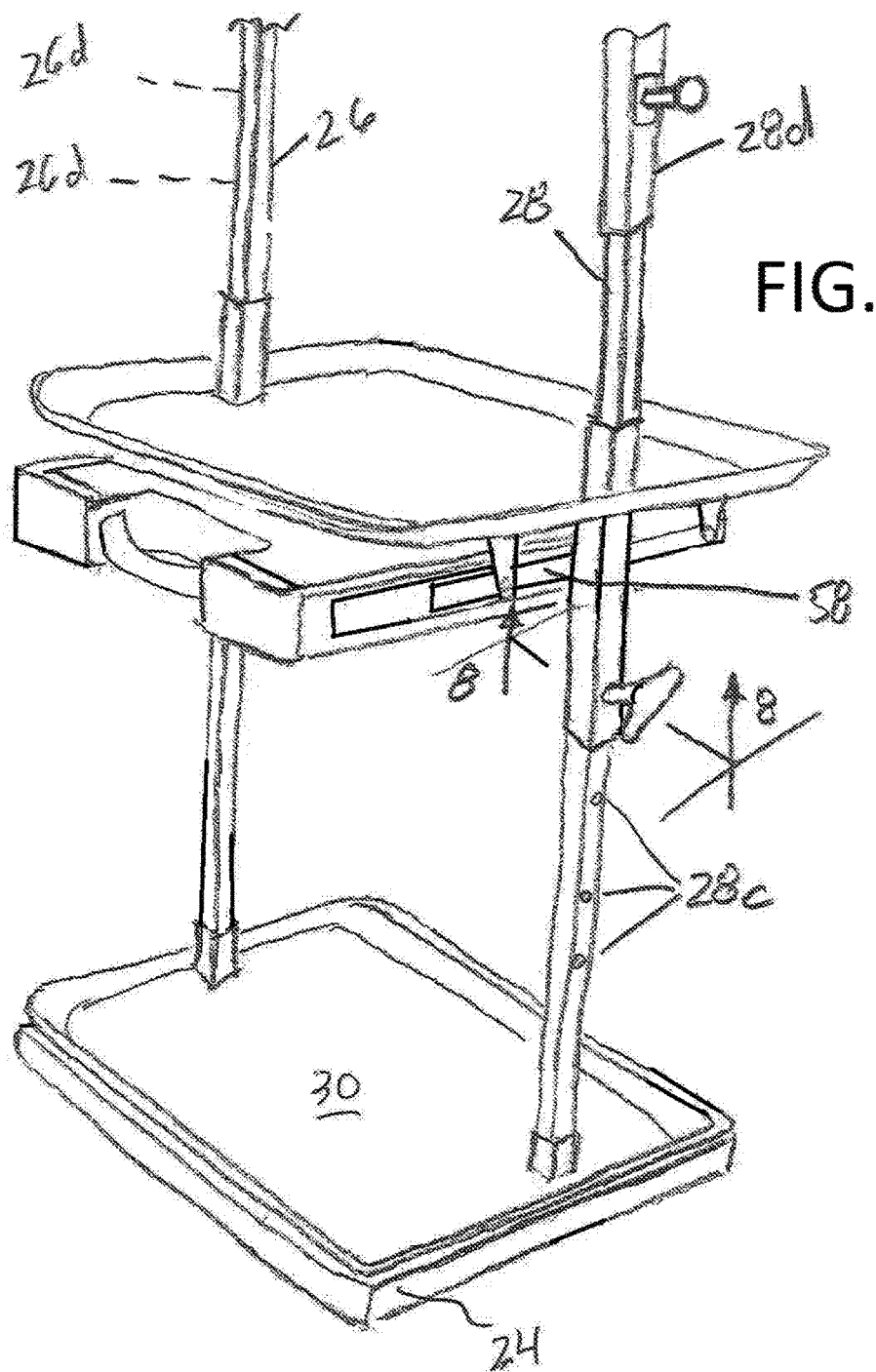
FIG. 4 is a fragmentary, front perspective view of the tool stand of FIG. 1 showing the tool stand top tray in an intermediate elevation with the handle open.

FIG. 2 shows a goose neck light 31 clamped to the upper tray.

Figure 6:
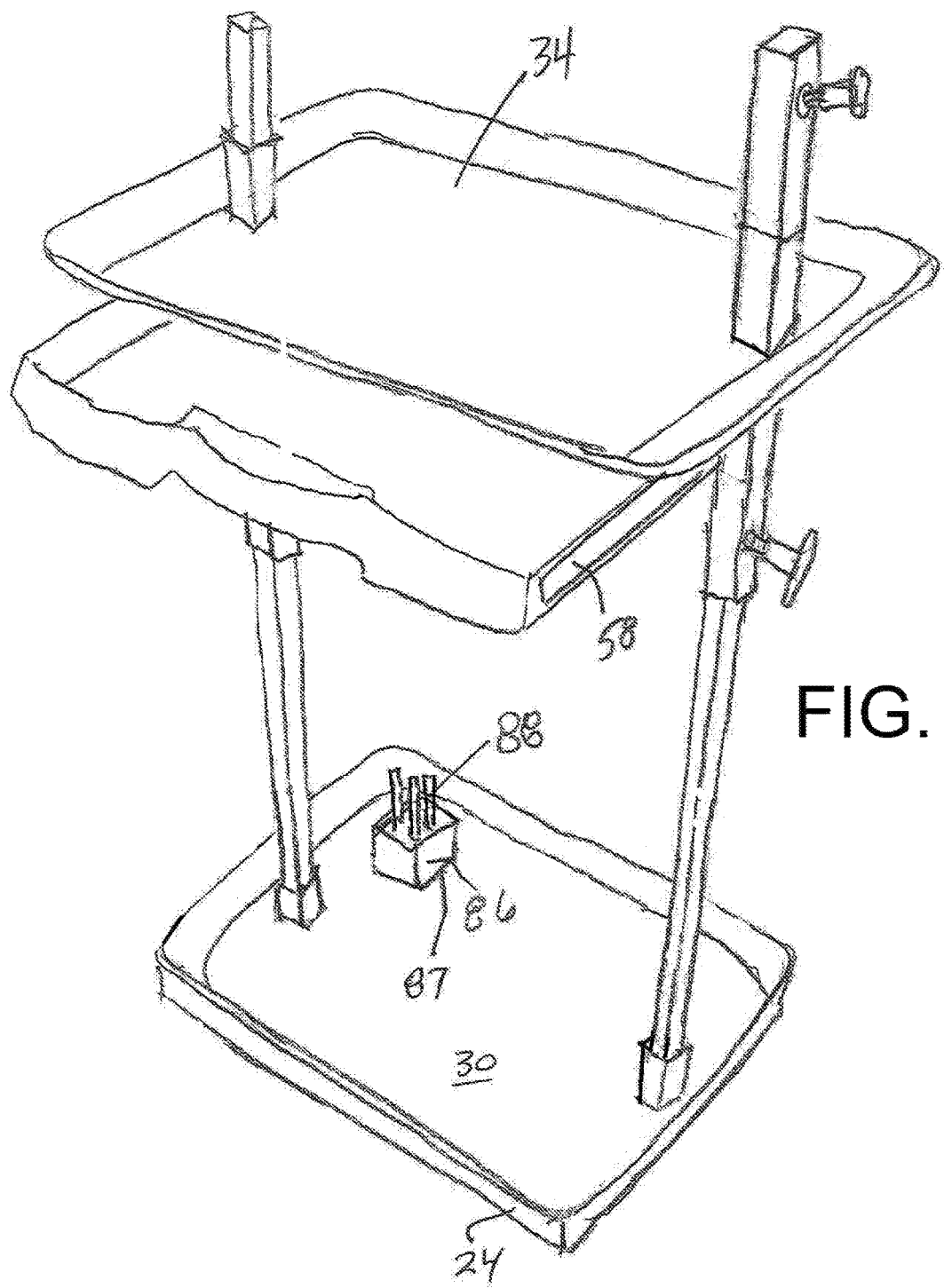
FIG. 6 is a front perspective of the tool stand of FIG. 4 with the top tray elevated to a higher elevation.
Figure 7:
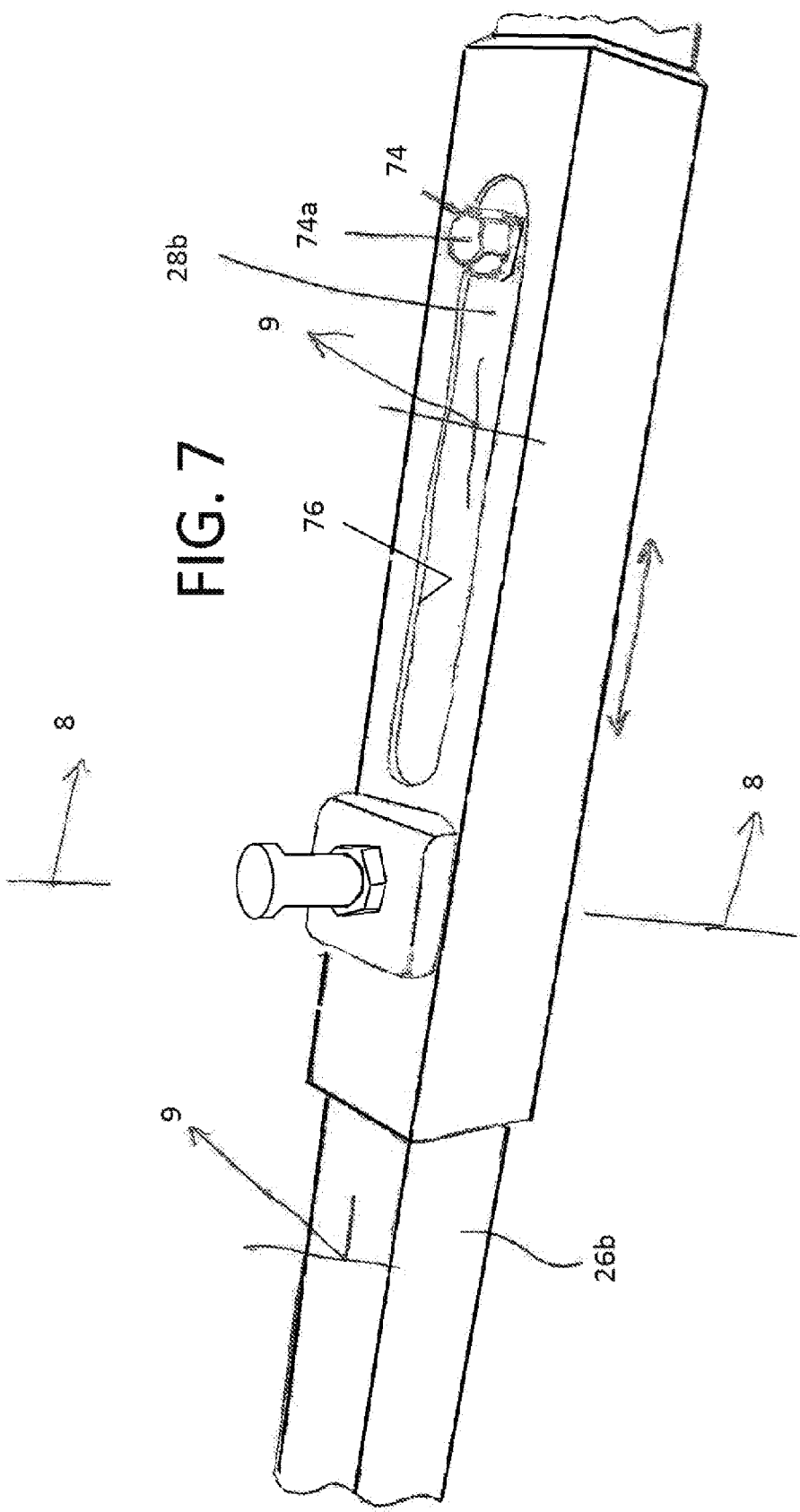
FIG. 7 is a fragmentary, enlarged perspective view taken from FIG. 1.

Advantageously, the lower tray 30 can be used to hold larger tools such as hand power tools. A drill bit-holding caddy 86 can be connected by a hinge 87 to a top surface of the tray 30 such that the relatively tall drill bits 88 can be pivoted to a horizontal orientation as shown in FIG. 2, and then pivoted to a vertical orientation as shown in FIG. 6. Thus, to facilitate lowering the upper tray 34 as low as possible for storage or transport, the drill bits can be horizontally oriented for a low profile, and then for use, the drill bits can be pivoted vertically to more practically view and select drill bits by the user.

The drawer 60 can be composed of plastic whereas the drawer slides can be steel or aluminum.

The column portion 26a includes holes 26c that are spaced apart and sized to be engaged by a pin of the spring-loaded locking pin mechanism 40. The column portion 28a includes holes 28c that are spaced apart and sized to be engaged by a pin of the spring-loaded locking pin mechanism 42. The holes 26c, 28c are arranged having a counterpart hole at the same elevation such that the pin adjusting mechanisms 40, 42, lock the tray on the columns 26, 28 at a selectable level, horizontal elevation. Thus, the spring-loaded locking pin mechanisms 40, 42 can be pulled outward to a pin retracted condition and the upper tray 34 can be raised to a selected elevation wherein the spring-loaded locking pin mechanisms 40, 42 can be released to engage in two corresponding holes 26c, 28c of the first and second column portions 26a, 28a. The upper tray 34 will thus be locked in place. The handle portions 26b, 28b also have holes 26d, 28d that allow the sliders 46, 48 to extend upward past the column portions 26a, 28a over the handle portions 26b, 28b when the handle portions are in a vertical orientation such as shown in FIG. 6, the handle being "open."

Figure 8:
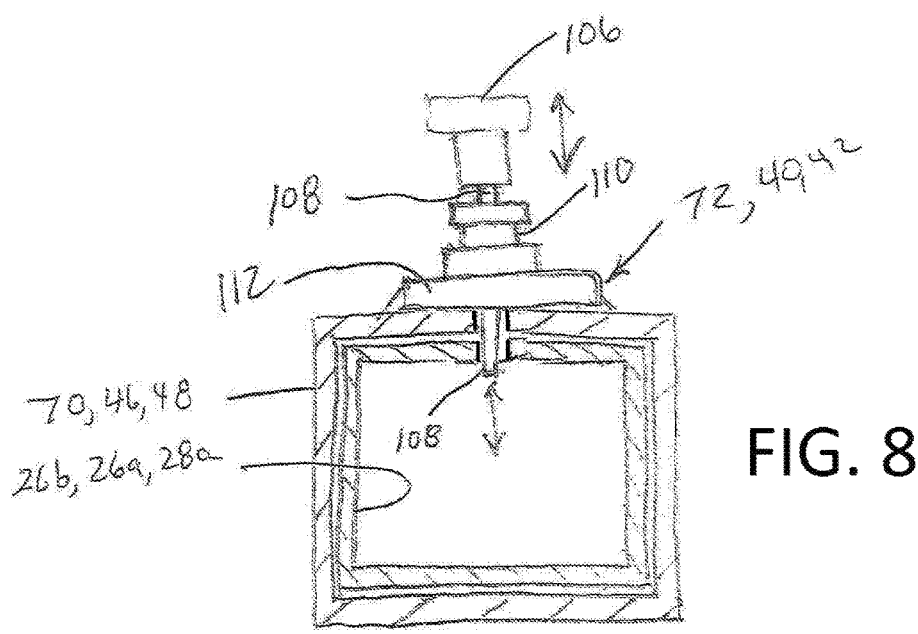
FIG. 8 is a sectional view taken generally along line 8-8 in FIG. 7.

FIG. 8 illustrates the construction of the spring-loaded locking pin mechanism 72 or the spring-loaded locking pin mechanisms 40, 42. Each mechanism includes a pull knob 106 that is connected to a pin 108 that passes through a spring housing 110 that is threaded into a base plate 112 that is welded or otherwise secured to the respective slider 70, 46, 48. The pin 108 extends through the spring housing 110, and through the base plate 112 to extend through the respective slider 70, 46, 48 and through the respective column portion 26a, 28a or handle portion 26b, 28b. Pulling the knob 106 up or out retracts the pin 108 from the respective column portion 26a, 28a or handle portion 26b, 28b to allow the respective slider 70, 46, 48 to be translated along the respective column portion 26a, 28a or handle portion 26b, 28b. As applicable, the pin can be moved to register with another selected hole through the respective column portion 26a, 28a or handle portion 26b, 28b. A spring (not shown) within the spring housing 110 urges the pin to the engaged, extended position into the respective column portion 26a, 28a or handle portion 26b, 28b.

Figure 9:
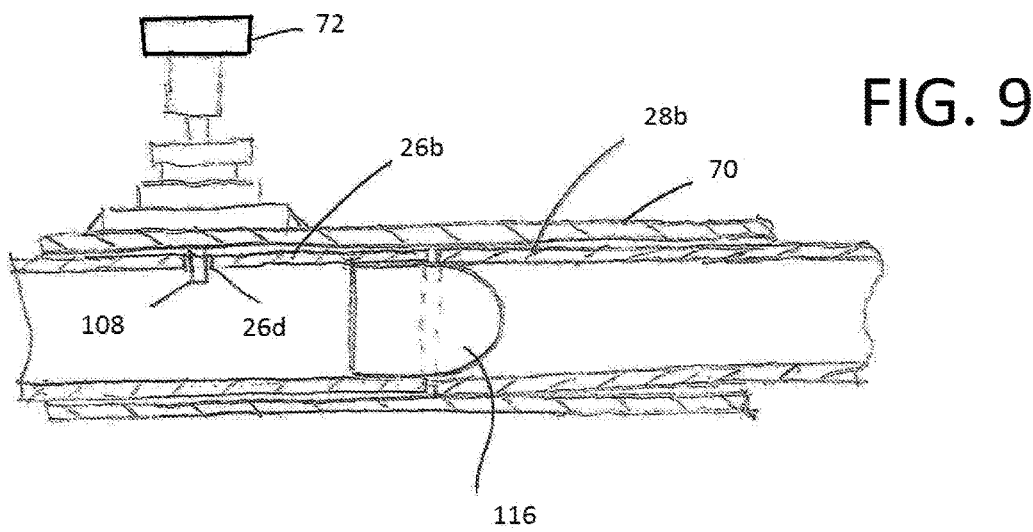
FIG. 9 is a sectional view taken generally along line 9-9 in FIG. 7.

FIG. 9 illustrates that the handle portion 26b includes an extended plug or nose portion 116 that is fixed into an open end of the handle portion 26b, by being press fit or welded, or the like, and extends out therefrom. When the handle portions 26b, 28b are folded down to engage to each other, the nose portion 116 is able to fit into the open end of the handle portion 28b to make more rigid the connection between the two handle portions 26b, 28b. Once the slider 70 is slid over the interface between the handle portions 26b, 28b and the nose portion 116, the pin mechanism 72 can be located over a hole 26d in the handle portion 26b to lock the slider 70 in position. A fastener 74 is fixed to the handle portion 28b and a head 74a thereof resides in an elongated slot 76 through the slider 70. The head 74a of the fastener 74 acts as a stop to limit the sliding movement of the slider 70 over the handle portions 26b, 28b. The slot 76 allows the slider to be retracted over the handle portion 28b to clear the intersection between the handle portions 26b, 28b for disengagement of the handle portions 26b, 28b to open the handle.

Figure 10:
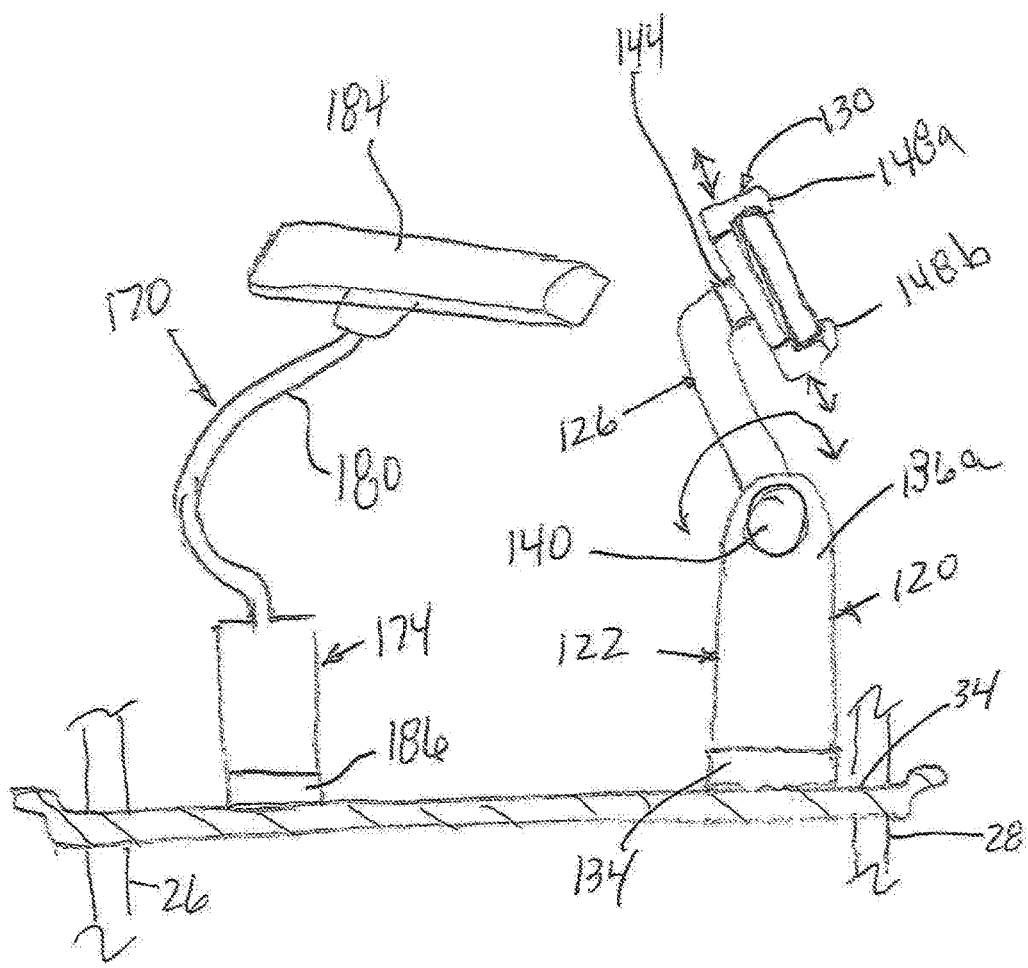
FIG. 10 is a partial sectional view taken from FIG. 1.

FIG. 10 illustrates two tools that can be used with the tool stand of the present invention. A first tool 120 includes a stand portion 122, an arm portion 126 and a media display-holding portion 130. The stand portion 122 includes a magnet base disk 134 and extending legs 136a, 136b fixed to the magnet base disk 134. An adjustable pivot joint 140 adjustably sets the angle between the legs 136a, 136b and the arm portion 126. The arm portion 126 is adjustably rotationally connected to the media display-holding portion 130 by a swivel joint 144. The media display-holding portion 130 includes upper and lower retaining jaws 148a, 148b that are slidably mounted within the holding portion 130 and are spring loaded such that the jaws 148a, 148b can be slid apart against the urging of internal springs in order to resiliently clamp a media display device between the jaws 148a, 148b. In this way smart phones or other devices of different dimensions can be held between the jaws on the media display-holding portion 130. Thus, the screen of the smart phone or other device can be directed at the user performing work. A larger media display-holding portion 152 for holding a tablet type of display device to replace the media display-holding portion 130 on the arm portion 126, is shown in FIG. 5 setting on the tray 34.

The tool 120 is particularly useful for a mechanic or a "do it yourselfer" to display instructions, particularly the type of instructions that are commonly displayed on YouTube for fixing, maintaining or otherwise servicing an appliance or a vehicle. The tool stand 20 can be adjusted for the tray 34 to be at an elevated position and the tool 120 can mount a media display device at eye level to the user.

Another useful tool displayed in FIG. 10 is a light 170. The light includes a base 174, an adjustable articulated and neck portion 180 and a lamp 184. Advantageously, the lap 184 can be an LED type work light. The neck portion 180 can be of an articulated type that can be bent to a desired shape to direct light from the lamp at the work area. The base 174 includes a magnet 186 to fix the tool 174 to the tray 34 at a selected position to direct light at the work area.

Figure 5:
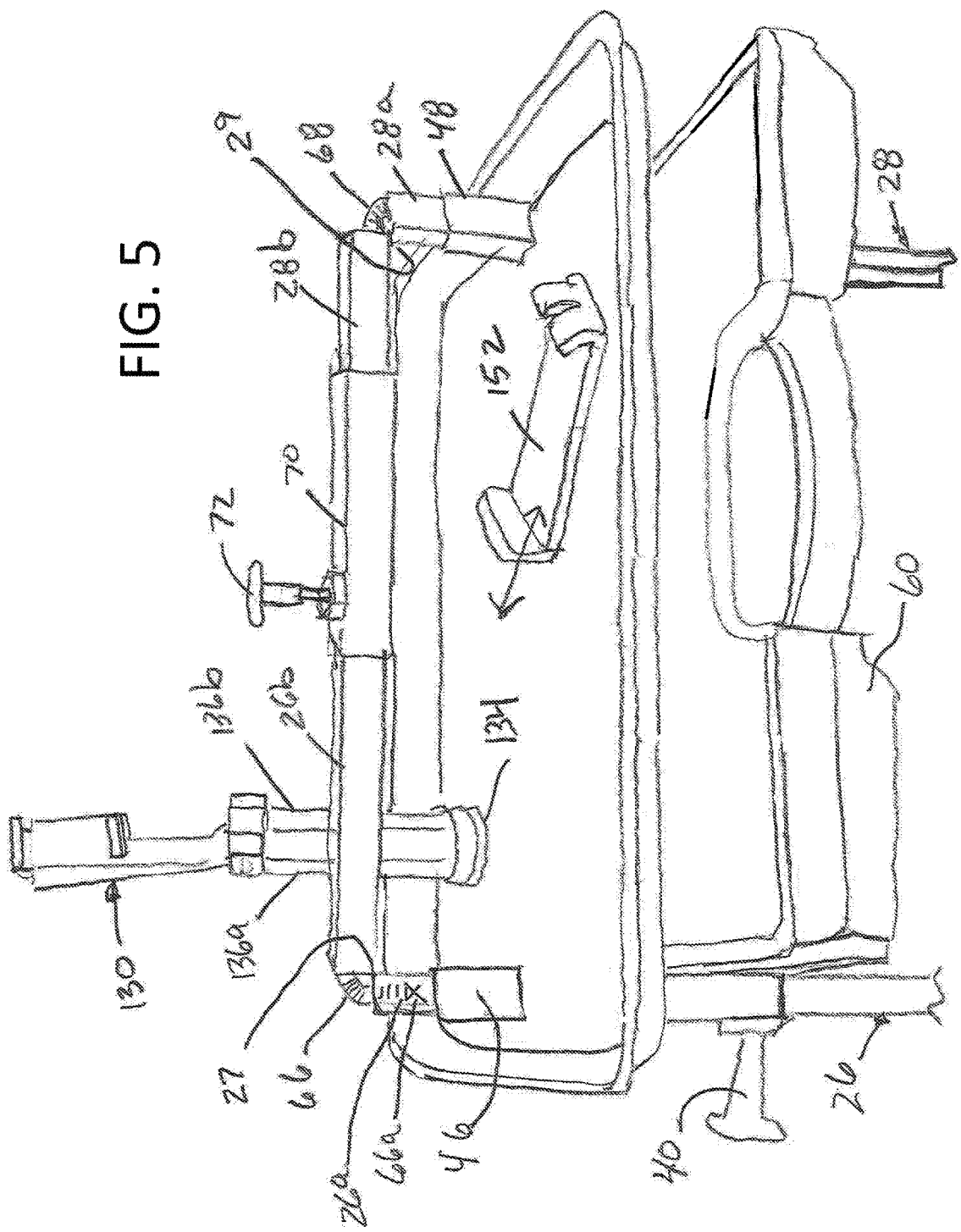
FIG. 5 is a fragmentary, front perspective of the tool stand of FIG. 4 with the handle closed.
Figure 11:
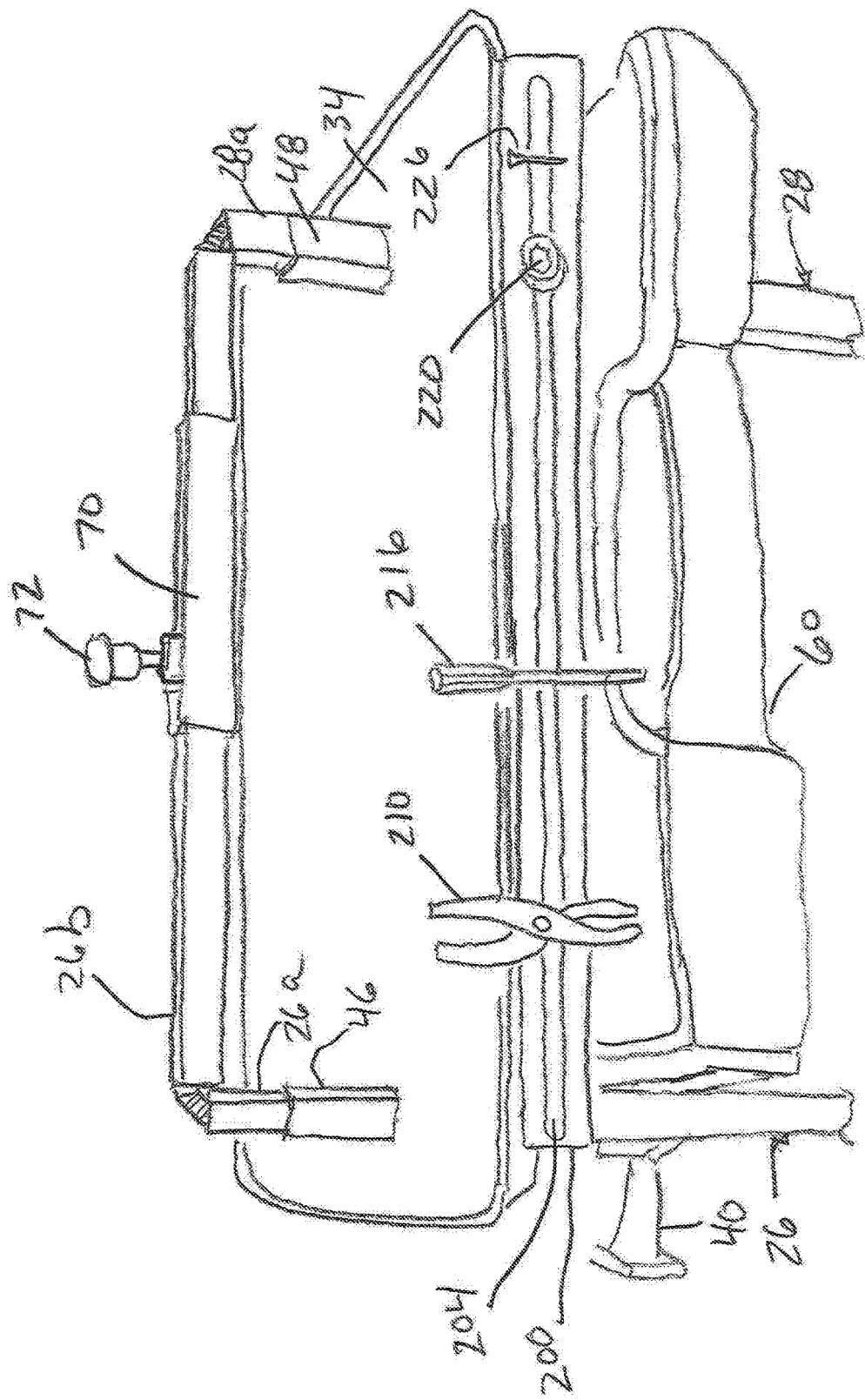
FIG. 11 is a perspective view of an enhancement of the tool stand shown in FIG. 1.

FIG. 11 illustrates an enhanced embodiment of the tool stand of FIG. 5 which includes a magnetic tool and part-holding bar 200 attached to a front edge of the top tray 34. The bar can be as described in U.S. Pat. No. 2,966,992, herein incorporated by reference. The bar 200 includes an elongated strip 204 made of magnet material. In this way tools such as pliers 210, screwdrivers 216, sockets 220 and parts such as fasteners 226 can be held by magnetic force to the bar 200 for convenient use or reuse by the mechanic or user during work.

While the bar 200 in FIG. 11 is shown mounted to front edge of the tray 34, one or more of the bars 200 could alternatively be attached to the back edge or side edges of the tray 34, to the drawer 60, to a top surface of the tray 34, to the bottom tray 30 or to the legs 26, 28.

Figure 12:
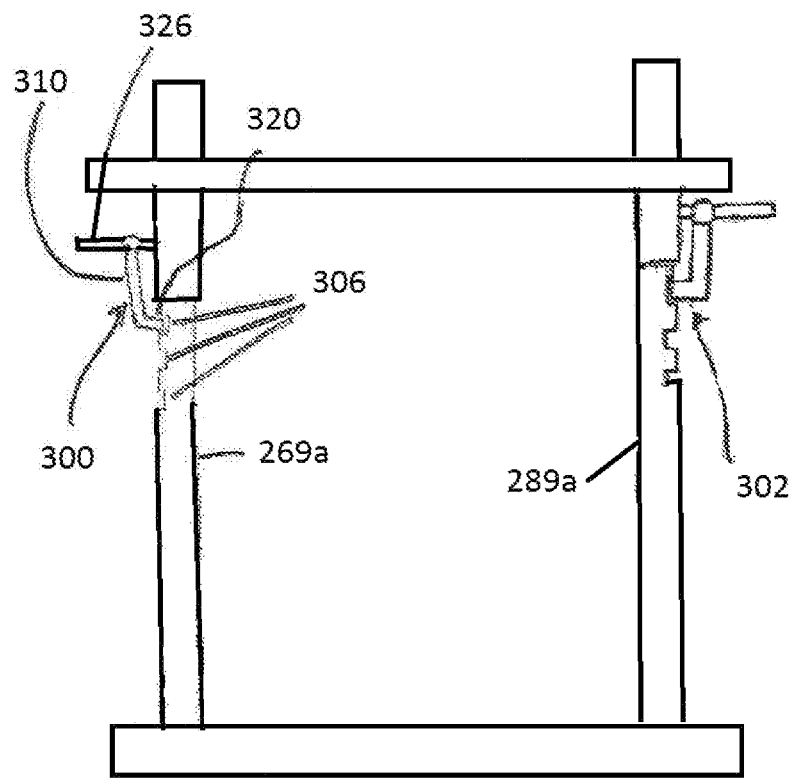
FIG. 12 is a fragmentary schematic view taken from FIG. 1 showing an alternate embodiment tray elevation fixing mechanisms.

FIG. 12 illustrates in schematic form an alternate tray elevation fixing mechanisms 300, 302 to the spring loaded pin assemblies 72, 40, 42 shown in FIGS. 8 and 9. The mechanisms 300, 302 are attached to sliders 46, 48 which slide on alternated column members 26a', 28a'. The column members 26a' and 28a' each include vertically spaced-apart slots 306. Each side is mirror image identical so only one side is described. A latch 310 is spring loaded to rotate to an engagement position with a head 320 of the latch 316 fitting into a selected slot 306 to fix that side in elevation to the respective column 26a', 28a'. To disengage the latch 310 the latch can be grasped and pulled outwardly against the urging of the spring (not shown). Alternately, a handle 326 is attached to the latch 310 and can be pulled up to rotate the latch 310 to disengagement from the slot 306.

Figure 13:
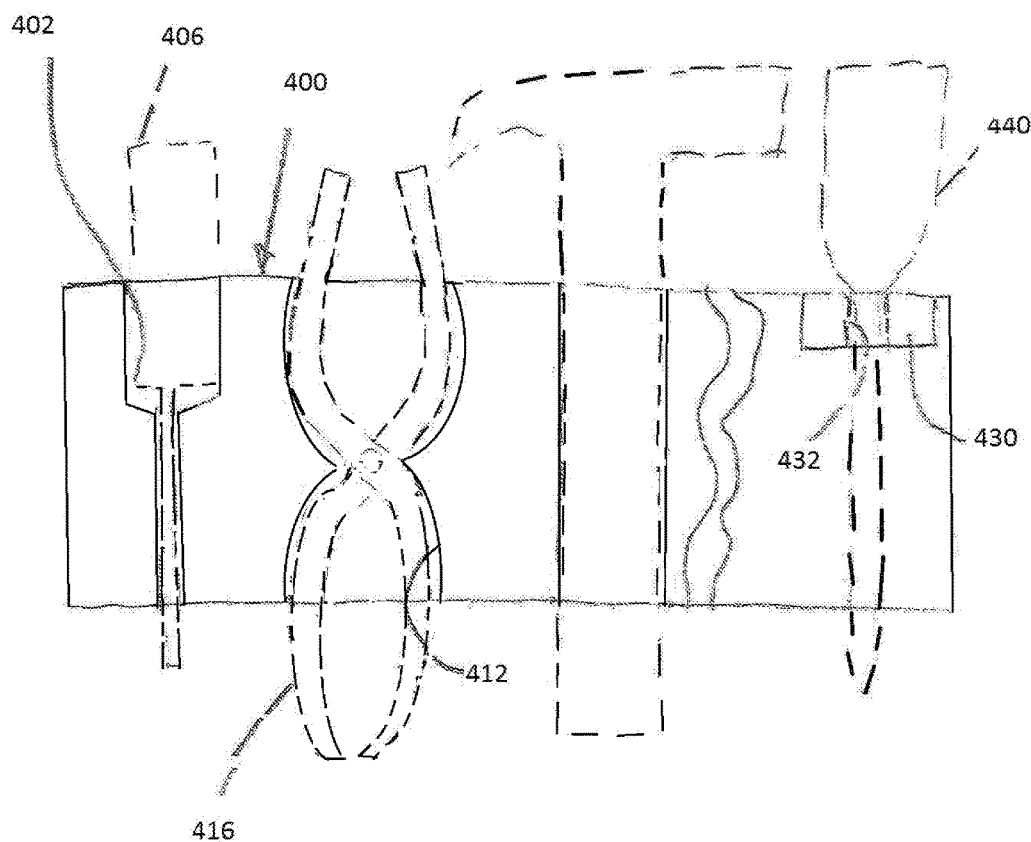
FIG. 13 is a fragmentary schematic view taken from FIG. 11 showing an alternate tool and part holding-bar.

FIG. 13 illustrates an alternate tool and part-holding bar 400 to the bar 200 shown in FIG. 11. This bar 400 can be formed of molded plastic and can have indentations particularly shaped to hold particular tools in a resilient friction grip of the tools. For example, a first shaped indentation or recess 402 is shaped to grip a screwdriver 406 (shown dashed). A second indentation 412 is shaped to grip a pair of pliers 416 (shown dashed). A third indentation 420 is shaped to grip a hammer handle 426 (shown dashed). The bar can also have one or more horizontal elements 430 having a hole 432 to receive tools such as a screwdriver 440. One or more of the bars 400 could be attached to the front edge, the back edge or side edges of the tray 34, to the drawer 60, to a top surface of the tray 34, to the bottom tray 30 or to the legs 26, 28.

According to the invention a tool and part holding bar can incorporate some or all of the holding techniques: magnetic bar, shaped recesses, or horizontal elements with holes.

FIG. 14-17 illustrate an alternate embodiment tool stand 500. The tool stand includes a cylindrical bent tubular frame 504 that has a base 506 supported on caster wheels 508. The frame can be metal. The base 506 includes front rearward curved sections 510, 512 that turn up as columns 516, 520. The columns 516, 520 include spaced apart circumferential grooves 522 along their length. Each column 516, 520 has a lower section 516a, 520a and an upper section 516b, 520b connected to the lower sections by hinges 516c, 520c which allows the upper sections 516b, 520b to either stand upright or pivot toward each other to form a handle as described in the first embodiment. A lower tray, basket or support surface 530 is fixed to the frame 504 by sleeves 534, 536 and welding or the like. The support surface 530 can be a perforated or solid basket or shelf, and can incorporate a drawer as described in the first embodiment (not shown). A tray, upper basket or support surface 550 is fixed to first and second sleeves or sliders 556, 558 by welding and the like. The upper and or lower trays 530, 550 can incorporate a magnetic tool and part-holding bar 200 attached to the respective tray as described in the first embodiment.

Figure 14:
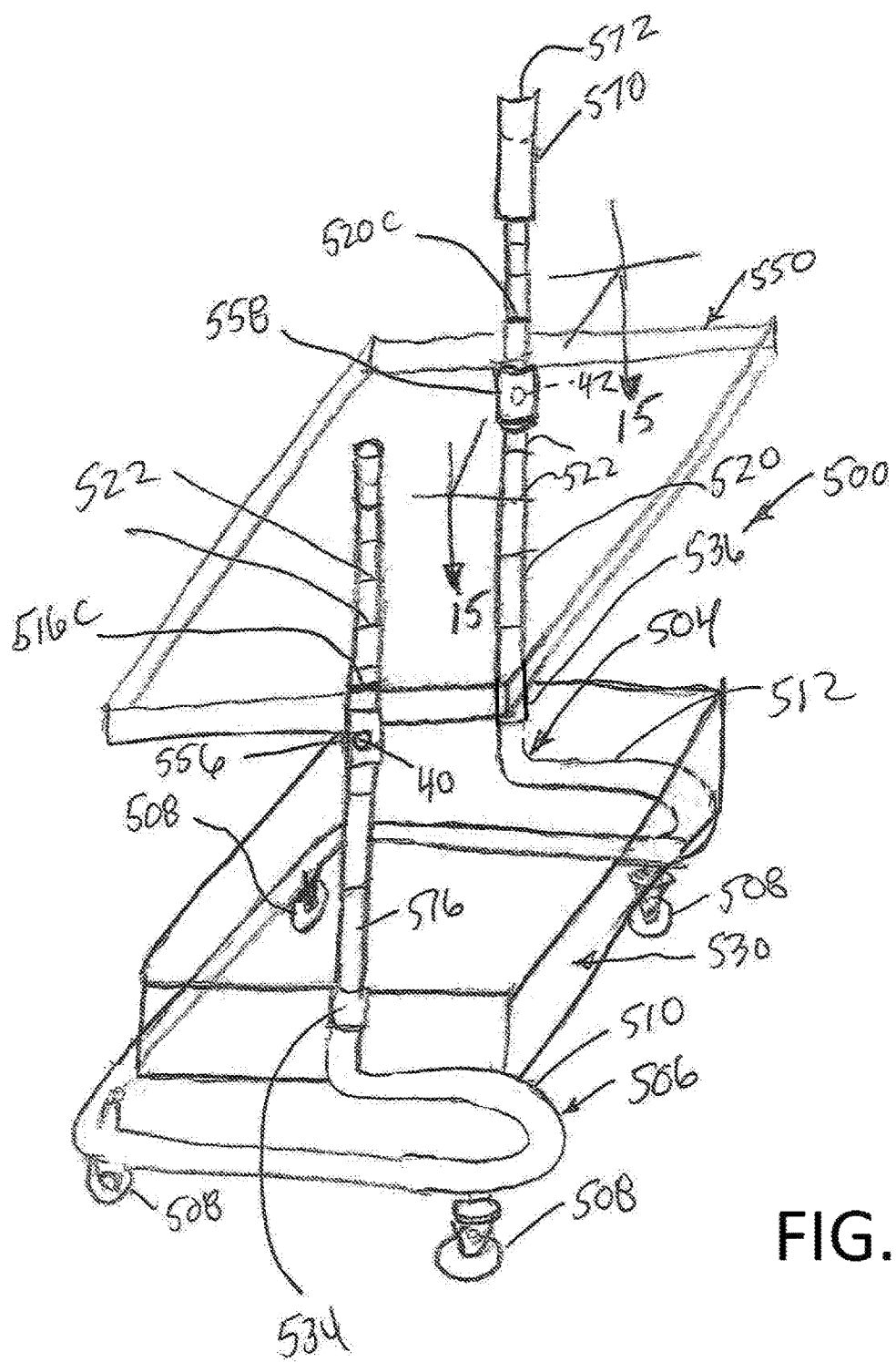
FIG. 14 is a perspective view of an alternate embodiment tool stand.
Figure 15:
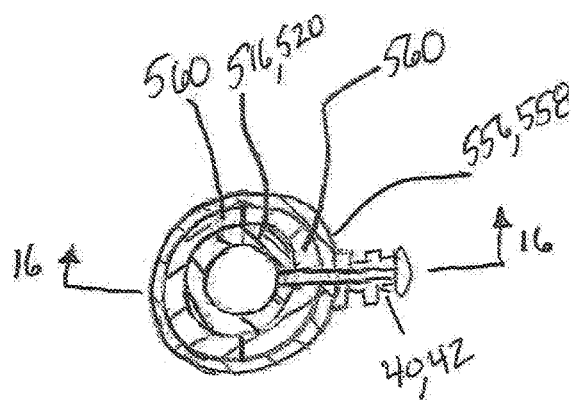
FIG. 15 is a sectional view taken generally along line 15-15 of FIG. 14.
Figure 16:
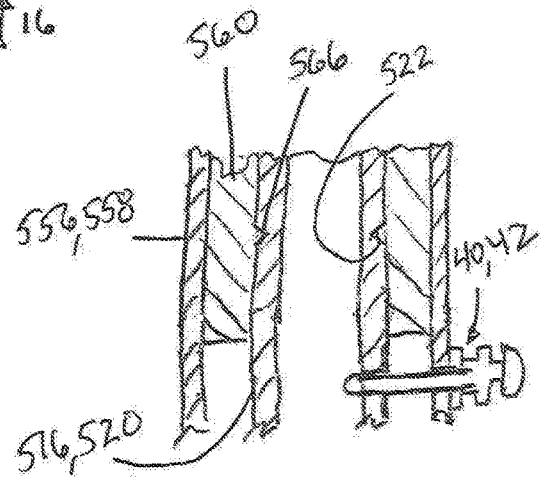
FIG. 16 is a sectional view taken generally along line 16-16 of FIG. 15.

The trays 530, 550 are shown in FIG. 14 as transparent to see underlying parts.

The first and second sleeves or sliders 556, 558 surround the columns 516, 520 and can be slid up and down the columns to set the elevation of the upper support surface 550. The sliders 556, 558 carry spring pins 40, 42 as described in the first embodiment which can engage holes (not shown) spaced vertically along the lengths of the columns 516, 520. Additionally, each slider can surround a two part grommet 560 (FIGS. 15, 16), that can be plastic, that is split into two shells longitudinally and has provisions to snap together around the respective column 516, 517. The grommet 560 makes a snug connection between the respective slider 556, 558 and the respective column 516, 517. The grommet 560 includes a circumferential ridge 566 that snaps into a selected circumferential groove 522 on the columns 516, 520 at the selected elevation of the upper support surface 550.

Figure 17:
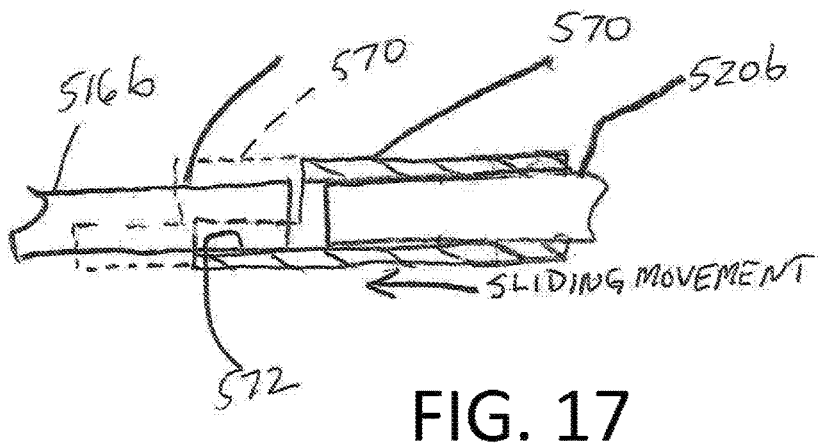
FIG. 17 is a sectional view of the handle engagement of FIG. 14.

The upper sections 516b, 520b of the columns 516, 520 can be folded down from the lower sections 516b, 520b about the hinges 516c, 520c to mutually engage as shown in FIG. 17. The hinges can be hinge pins that connect the upper and lower sections. A sleeve 570 surrounds one of the upper sections 516b, 520b, such as 520b. The sleeve 570 includes a semi-cylindrical end portion 572 that allows for one of the upper sections 516b, 520b to be placed on the sleeve to facilitate alignment of the upper sections 516b, 520b in preparation for sliding the sleeve over the free ends of both sections (shown dashed) to provide the handle for lifting the tool stand such as described with regard to the first embodiment. A stop (not shown) can be provided to retain the sleeve on one of the upper sections 516b, 520b and to prevent over travel of the sleeve on the respective other upper section 516b, 520b.

The embodiment of FIGS. 14-17 can incorporate any of the other features of the previous embodiments.

For any of the embodiments the materials of construction can be plastic or metal, such as aluminum or steel. The method of attaching parts can be by fasteners, adhesives, welding, and the like.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A tool stand, comprising:
a frame having a base and two columns extending up from the base;
upper sections of the two columns being hingedly connected to lower sections of the two columns respectively such that the upper sections can be positioned from an upright orientation that is generally perpendicular to the base to a downward pivoted orientation that is generally perpendicular relative to the upright orientation; wherein in the downward pivoted orientation the columns each extend toward each other to form a handle;
at least one rigid support surface for storing objects, wherein the at least one support surface is configured to slide vertically on the two columns and be fixable thereon at at least an upper elevation;
wherein when the at least one support surface is at the upper elevation, the upper sections of the two columns are prevented from pivoting to the downward pivoted orientation, and when the at least one support surface is at a lower elevation below said upper elevation the upper sections of the two columns can be pivoted to the downward pivoted orientation to form the handle.

2. The tool stand according to claim 1, wherein the frame is formed by a bent cylindrical tube.

3. The tool stand according to claim 1, wherein one of the upper sections carries a slidable sleeve, and when the upper sections are pivoted to the downward pivoted orientation the sleeve is configured to slide over and bridge between both upper sections to retain the upper sections together to form the handle.

4. The tool stand according to claim 3, wherein the sleeve includes a selectively engagable locking portion to lock the sleeve in the handle forming position.

5. The tool stand according to claim 1, wherein the support surface is fixed to opposite lateral sliders, and the sliders are slidable along the vertical length of the two columns, and each slider has a selectively engagable locking portion to set the upper elevation of the at least one support surface on the two columns.

6. The tool stand according to claim 1, wherein the frame is composed of square tubular members.

7. The tool stand according to claim 1, wherein the upper sections and the lower sections are each hingedly connected respectively by a hinge and a spring to bias the upper sections to the vertical orientation.

8. The tool stand according to claim 1, further comprising a media player holder mounted on the at least one support surface to allow positioning of a media player on the tool stand.

9. The tool stand according to claim 1, wherein the at least one support surface is selectively lockable at the upper elevation elevation along the two columns by a spring pin engaging corresponding holes formed in the two columns.

10. The tool stand according to claim 1, wherein the at least one support surface comprises two trays vertically spaced apart.

11. The tool stand according to claim 1, comprising a drawer beneath the at least one support surface.

12. The tool stand according to claim 1, comprising a magnetic bar connected to the at least one support surface for magnetically attaching tools and parts.

13. The tool stand according to claim 1, comprising a work light attached to the at least one support surface.

14. The tool stand according to claim 1, wherein the at least one support surface comprises a top tray; wherein the tool stand further comprises a bottom tray having a tool holder mounted thereon, wherein the tool holder is pivotal from a vertical orientation to a more low profile horizontal orientation to allow the top tray to be lowered more closely to the bottom tray.

15. The tool stand according to claim 1, wherein the at least one support surface comprises a metal tray.

16. A tool stand, comprising:
a frame having a base and two columns extending up from the base;
upper sections of the two columns being hingedly connected to lower sections of the two columns respectively such that the upper sections can be positioned from an upright orientation to a downward pivoted orientation with the columns extending toward each other to form a handle;
at least one support surface that is slidable vertically on the two columns and fixable at select elevations;
wherein when the at least one support surface is at an upper elevation from said select elevations the upper sections of the two columns are prevented from pivoting to the downward pivoted orientation, and when the at least one support surface is at a lower elevation from said select elevations the upper sections of the two columns can be pivoted to downward pivoted orientation to form the handle;
wherein one of the upper sections carries a slidable sleeve, and when the upper sections are pivoted to the downward pivoted orientation the sleeve is configured to slide over and bridge between both upper sections to retain the upper sections together to form the handle;
wherein the sleeve includes a first selectively engagable locking portion to lock the sleeve in position; and
wherein the at least one support surface is fixed to opposite lateral sliders, and the sliders are slidable along a vertical length of the two columns, and each slider has a second selectively engagable locking portion to set a desired elevation from said select elevations of the at least one support surface on the two columns.

17. The tool stand according to claim 16, wherein the upper sections and the lower sections are each hingedly connected respectively by a hinge and a spring to bias the upper sections to the vertical orientation;
wherein the second selectively engagable locking portion includes a spring pin that is configured to engage corresponding holes formed in the two columns;
wherein a magnetic bar is connected to the at least one support surface for magnetically attaching tools and parts;
wherein the at least one support surface comprises a top tray
having a drawer beneath the top tray; and.

* * * * *